United States Patent
Nakamura et al.

Patent Number: 5,244,713
Date of Patent: Sep. 14, 1993

[54] OPTICAL FILM

[75] Inventors: Kimishige Nakamura; Toyokazu Okada; Kazuaki Sakakura, all of Osaka, Japan

[73] Assignee: Sumitomo Chemical Co., Ltd., Osaka, Japan

[21] Appl. No.: 887,658

[22] Filed: May 26, 1992

Related U.S. Application Data
[63] Continuation of Ser. No. 457,633, Dec. 27, 1989, abandoned.

Foreign Application Priority Data
Dec. 27, 1988 [JP] Japan ............... 63-331077

[51] Int. Cl.$^5$ ............... B32B 3/00
[52] U.S. Cl. ............... 428/156; 428/212; 428/333; 428/910; 528/205; 359/484; 359/249
[58] Field of Search ............... 428/156, 212, 333, 910; 528/205; 350/374, 387

[56] References Cited
U.S. PATENT DOCUMENTS
4,461,888 7/1984 Rogers et al. ............... 528/205
4,536,240 8/1985 Winn ............... 156/74

FOREIGN PATENT DOCUMENTS
0277804 10/1988 European Pat. Off.

Primary Examiner—Patrick J. Ryan
Assistant Examiner—Elizabeth Evans
Attorney, Agent, or Firm—Sughrue, Mion, Zinn, Macpeak & Seas

[57] ABSTRACT

An optical film having high optical uniformity is disclosed, including a thermoplastic resin film having no periodic thickness variation of sine waveform having a pitch of 50 mm or less and a thickness change of 0.5 μm or more on continuous thickness measurement in the machine direction, and an optical film having a retardation value of 1200 nm or less with a fluctuation of not more than 10% and a rate of change of not more than 1.3%/cm, which is obtained by stretching said thermoplastic resin film. The optical film is laminated on a polarizing sheet to serve as a phase retarder.

26 Claims, 4 Drawing Sheets

OPTICAL FILM

This is a continuation of application Ser. No. 07/457,633 filed Dec. 27, 1989, now abandoned.

FIELD OF THE INVENTION

This invention relates to an optical film applicable to liquid crystal displays and more particularly to a transparent film with high optical uniformity suited for optical use.

BACKGROUND OF THE INVENTION

Currently available optical films include (1) low-birefringent optical films having nearly no orientation and having a retardation of 100 nm or less which are useful as a protective film of a polarizing sheet, etc., such as a cellulose triacetate film used as a protective film of a polarizing sheet; and (2) birefringent optical films having a retardation of ¼λ (130 to 150 nm; λ is a wavelength of incident light) which are useful for anti-glare materials, etc., such as a uniaxially stretched cellulose acetate film (e.g., a cellulose diacetate film). The optical film having a retardation of ¼λ is combined with a linear polarizing sheet with the optical axis thereof being inclined at 45° with respect to the direction of linear polarized light to provide a circular polarizing sheet. Because of glare protection function to cut reflected light, it is used in various anti-glare materials, such as a VDT (visual display terminal) filter. The term "retardation" (R value) as used herein is a product of a birefringence of the film or sheet ($\Delta n$) and a thickness of the film or sheet (d), i.e., $R = \Delta n \times d$.

On the other hand, attempts have been made to improve image quality of TN (twisted nematic) mode liquid crystal displays, in which liquid crystal molecules have a twisted angle of 90° and a pair of polarizing sheets are provided on and under a liquid crystal cell with the absorption axes thereof being crossing or in parallel, which are used in watches or electric calculators by application of a birefringent optical film as disclosed in JP-A-61-186987 and JP-A-60-26322 (the term "JP-A" as used herein means an "unexamined published Japanese patent application").

With the recent increasing demands for an increase of display capacity and enlargement of a display screen, a liquid crystal display whose liquid-crystal molecules have a twisted angle of more than 90° (i.e., about 180° to 270°), which is called an STN (super twisted nematic) mode liquid crystal display, has been developed. However, the STN mode liquid crystal display suffers from coloring due to birefringence of liquid crystal molecules and therefore fails to achieve a black-and-white display (hereinafter referred to as a B/W display) that is feasible in conventional TN mode liquid crystal displays. For example, some of the STN liquid crystal displays make a deep blue display on a yellowish green background. Displays assuming such a hue, they often encounter with limitations on making a color display, such as a multi-color display and a full-color display.

In order to solve this problem of the STN mode liquid crystal displays, it has been proposed to add, as an optical compensator, another liquid crystal cell for color removal to a combination of an STN mode liquid crystal cell and polarizing sheets to thereby achieve a B/W display as taught, e.g., in *Nikkei Micro Device*, Oct. issue, p. 84 (1987). This technique, however, has disadvantages of high cost, an increased weight, and an increased thickness. Therefore, it has been studied to substitute the additional liquid crystal cell with a birefringent optical film.

For the purpose of improving image quality of liquid crystal displays, it has also been studied to apply uniaxially or biaxially stretched birefringent optical films having various retardation values to various liquid crystal displays.

However, the state-of-the-art optical films cannot be used for the new applications including liquid crystal displays for reasons that (1) the retardation values thereof do not optically meet the purpose, (2) the optical axis thereof cannot be arbitrarily controlled, and (3) they suffer from considerable optical color unevenness, typically exemplified by a stripe pattern (hereinafter referred to as streaks), sometimes rather impairing image quality.

SUMMARY OF THE INVENTION

The inventors have conducted extensive investigations to solve the above-described problems and, as a result, reached the present invention.

That is, the present invention relates to a thermoplastic resin film which is free from periodic thickness variation of sine waveform having a pitch of 50 mm or less and a thickness change of 0.5 μm or more when continuously measured in the machine direction, and to an optical film having a retardation value of 1200 nm or less with a fluctuation of 10% or less which is obtained by uniaxially or biaxially stretching the above-described film.

The present invention also relates to an optical film having a retardation value of 1200 nm or less with a fluctuation of 10% or less and a rate of change of 1.3%/cm or less which is obtained by uniaxially stretching the thermoplastic resin film.

DETAILED DESCRIPTION OF THE INVENTION

Figure 1:
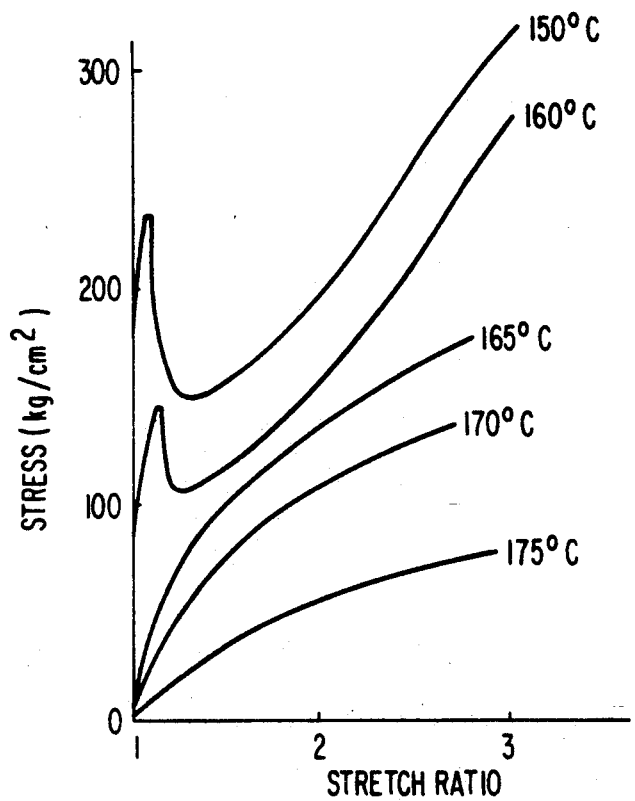
FIG. 1 shows stress-strain curves of the polycarbonate film used in Examples 1 to 5 and 10 and Comparative Examples 1 to 4 and 9.

The thermoplastic resin which can be used for the optical films of the present invention includes polycarbonate resins; methacrylate resins, such as polymethyl methacrylate and methyl methacrylate copolymers comprising methyl methacrylate as a main component and other ethylenic comonomers; styrene resins, such as polystyrene, styrene-acrylonitrile copolymers, styrene-methyl methacrylate copolymers, and styrene copolymers comprising styrene as a main component and other ethylenic comonomers; α-methylstyrene polymer resins, such as an α-methylstyrene homopolymer, α-methylstyrene-acrylonitrile copolymers, and α-methylstyrene copolymers comprising α-methylstyrene as a main component and other ethylenic comonomers; acrylonitrile resins, such as polyacrylonitrile and acrylonitrile copolymers; polyester resins, such as polyethylene terephthalate and polyester copolymers; polyamide resins, such as nylon 6 and nylon 66; vinyl chloride resins, such as polyvinyl chloride and vinyl chloride copolymers; polyolefin resins, such as polyethylene, polypropylene, ethylene copolymers, and propylene copolymers; polysulfone, polyether sulfone, fluorine-containing resins, etc. and modified resins thereof; and a blend of any of these resins and a transparent low-molecular weight compound (e.g., high-molecular weight liquid crystals and low-molecular weight liquid crystals) or a transparent inorganic compound. These resins may be used either individually or as a mixture of two or more thereof.

Preferred of these resins are polycarbonate resins; styrene resins, e.g., polystyrene, styrene-acrylonitrile copolymers, and styrene-methyl methacrylate copolymers; acrylonitrile resins; polyester resins, e.g., polyethylene terephthalate and polyester copolymers; polysulfone; and polyether sulfone.

The terminology "film" as used herein embraces not only films in a strict sense but sheets having a thickness of, for example, 400 μm or more.

The optical film of the present invention can be continuously prepared from the thermoplastic resin by solvent casting, melt extrusion, calendering, and the like, with solvent casting being preferred. More specifically, the most preferred are those films prepared by solvent casting using a polycarbonate resin, a styrene resin, an acrylonitrile resin, etc. as a casting resin.

The reason why the solvent casting is preferred for producing the optical films of the invention is that the resulting films are excellent in thickness uniformity and free from defects such as gels or foreign particles.

It is important in carrying out solvent casting to properly maintain a polymer concentration in the casting compound. A suitable polymer concentration of the casting compound usually ranges from 10 to 35% by weight, and preferably from 15 to 30% by weight, though somewhat varying depending on the kind and molecular weight of the polymer and the kind of the solvent. In case of using a polycarbonate resin having a molecular weight of about 60,000, a more preferred polymer concentration is from 18 to 25% by weight.

Figure 2:
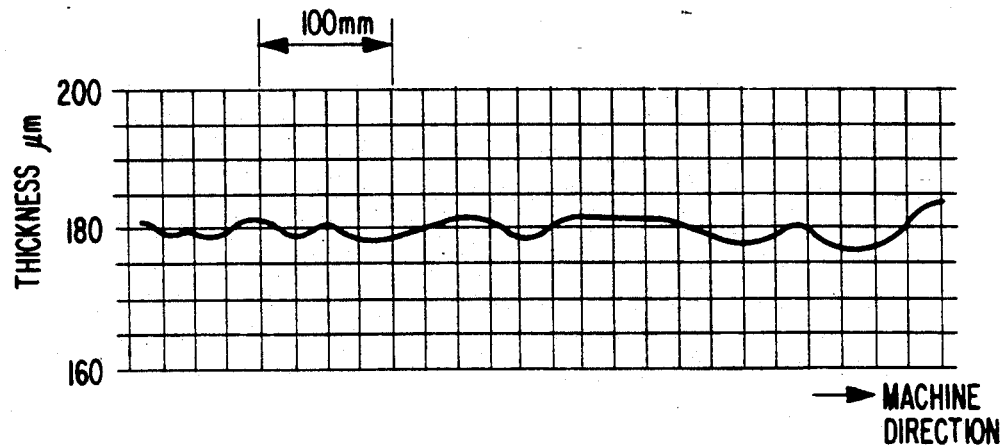
FIGS. 2 through 10 each shows a thickness variation curve of each of the films obtained in Examples 1 and 2, Comparative Examples 1 and 2, Example 6, Comparative Example 5, Example 8, Comparative Example 7, Example 11, Example 14, and Comparative Example 9, respectively, as obtained by continuous thickness measurement in the machine direction.
Figure 3:
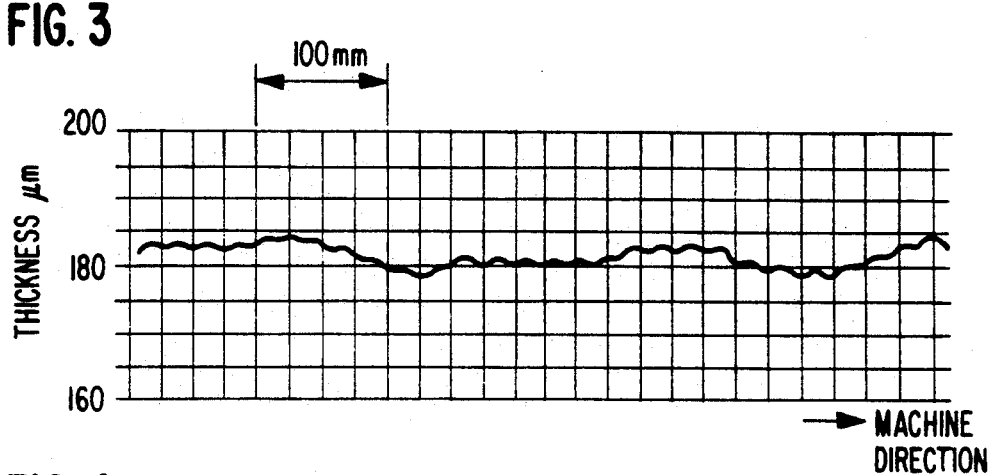

The terminology "periodic thickness variation of sine waveform" as used in the present invention means thickness variation as depicted, for example, in FIG. 3. As shown in FIG. 3, even where the thickness variations are relatively small, if the pitches of variations are small and regular, unfavorable streaks in the direction perpendicular to the machine direction noticeably appear after stretching. To the contrary, even where the thickness variations (i.e., fluctuations) are relatively large, if the pitches are large and irregular as shown in FIG. 2, such streaks are not observed.

The thickness variations of sine waveform are approximately consistent with visible streaks called gear marks or adhesion marks which appear on a film web continuously produced by solvent casting, extrusion or calendering in the direction perpendicular to the machine direction.

The terminology "machine direction" as used herein means a take-off direction of the film produced by solvent casting, extrusion, calendering, etc., i.e., the longitudinal direction (sometimes called extrusion direction in the case of melt extrusion).

The film obtained by the above-described film formation techniques may be used as an optical film either as it is or after being stretched depending on the end use.

The film as produced sometimes suffer from defects such as die lines or undergo slight orientation depending on the film formation conditions. Such slight orientation can be effectively reduced by subjecting the film to a heat treatment.

When a heat treatment of the film is carried out at temperatures above the heat distortion temperature of the film, the birefringence of the film becomes essentially zero to provide an optical film exhibiting no birefringence according to the present invention. This film is suitable for uses requiring zero birefringence, such as a protective film for a polarizing sheet, a protective film for a laser card, etc.

On the other hand, when the above obtained optical film is subjected to uniaxial or biaxial stretching so as to possess the optimum birefringence, there can be obtained a birefringent optical film according to the present invention.

Uniaxial stretching of the film can be performed by known techniques including transverse uniaxial stretching by tentering, longitudinal uniaxial stretching utilizing a difference in peripheral speed of rolls, and compression stretching between rolls. In particular, transverse uniaxial stretching by tentering is useful in view of reduction of optical color unevenness of the resulting film.

To achieve uniform stretching in transverse uniaxial stretching, it is important to appropriately select a stretching temperature. The stretching temperature should be above the temperature at which a yield point of a stress-strain curve of tensile test apparently disappears. If it is in the temperature range where a yield point appears in the stress-stain curve or at lesser temperatures, the stretching becomes non-uniform to cause thickness unevenness, and the resulting stretched film has a large fluctuation and a large rate of change in retardation.

The stretch ratio is not particularly limited. It is usually from about 1.2 to 6 and preferably from about 1.2 to 4.0, though more or less varying depending on the kind of the thermoplastic resin used.

A heat treatment after stretching would be useful for improvement of dimensional stability and uniformity of retardation of the resulting stretched film. The heat treatment temperature is preferably selected from the range of from around heat distortion temperature up to the stretching temperature. The terminology "heat distortion temperature" as used herein means a value determined under a load of 18.6 kgf/cm$^2$ according to JIS K-6735.

Biaxial stretching can be carried out by successive biaxial stretching comprising first uniaxial stretching by any of the above-described techniques followed by second stretching in the direction perpendicular to the first stretching, simultaneous biaxial stretching comprising longitudinal stretching simultaneously with transverse stretching, and the like. The biaxial stretching technique is appropriately selected according to desired physical properties.

The retardation (R) value of the optical film can be appropriately selected depending on the end use. For example, for use as a color compensator of STN mode liquid crystal displays, a suitable R value ranges from about 200 to about 1000 nm. For use as an optical film for compensating for color unevenness of a liquid crystal cell and improving image quality, a suitable R value ranges from about 0 to about 200 nm. For use as an optical film having biaxial orientation for improving view angle characteristics, etc., a suitable R value is about 500 nm or less. For use as a protective film of polarizing sheets, the film suitably has an R value of not more than about 100 nm and preferably has no orientation. Further, a suitable R value for use as an optical filter, etc. is selected from about 0 to about 1200 nm according to the purpose.

A fluctuation of the R value ($\Delta R$) of the optical film according to the present invention is not more than 10%, preferably not more than 7%, and more preferably not more than 5%, of an average R value. The rate of change (G) of the R value is not more than 1.3%/cm, preferably not more than 1.0%/cm, and more preferably not more than 0.6%/cm. If the fluctuation or rate of change of retardation is more than 10% or more than 1.3%/cm, respectively, the film suffers from streaks and is unapplicable to various optical uses, especially in liquid crystal displays, due to optical unevenness.

As stated above, the optical film of the present invention is a film obtained from a specific thermoplastic resin through a specific film formation technique, such as solvent casting, which, if desired, is subjected to a heat treatment or stretching so as to have a desired retardation value.

With respect to thickness precision demanded for the film to be heat treated and/or stretched, the film should be free from periodic thickness variation of sine waveform having a pitch of 50 mm or less and a thickness change of 0.5 μm or more and preferably 0.3 μm or more. A film having such thickness precision can be used as such as a low-birefringence optical film having an R value of 0 nm or not more than 200 nm. Further, stretching of the film having the above-described thickness precision provides an excellent birefringent optical film free from optical color unevenness which does not suffer from periodic streaking when observed under crossed polarizers.

Retardation of optical films according to the present invention can be determined with a polarization microscope, a spectrophotometer, etc. An average R value ($\overline{R}$) is an average of 36 R values as determined at equally selected 36 points of a stretched film sample having a size of 30 cm × 30 cm. A retardation fluctuation ($\Delta R$) can be obtained by dividing a difference between the maximum and the minimum out of the above-obtained 36 R values by the average R value (expressed in terms of percentage). A rate of change of retardation (G) is obtained by determining R values at points at 1 cm intervals in the optical axis direction and the direction perpendicular to the optical axis of the above-described sample, dividing a difference of an R value between each two adjacent points by the average R value ($\overline{R}$), and obtaining the maximum of the quotients.

The streaks appearing on the optical film in the direction perpendicular to the machine direction under crossed polarizers can be observed by placing a film sample (30 cm × 30 cm) under crossed polarizers, etc. with its optical axis being at about 45° with respect to the direction of linear polarized light and observing color unevenness of the transmitted light with eyes.

Determination of the continuous thickness change in the machine direction of the film can be conducted with a contact or non-contact continuous thickness meter while running the film by about 100 cm in the machine direction.

The optical film of the present invention can also be applied to liquid crystal displays, etc. by adhering to one side of a polarizing sheet to make a composite polarizing sheet.

The polarizing sheet with which the optical film is combined in the composite polarizing sheet is arbitrary. One illustrative example of the polarizing sheet comprises a uniaxially stretched film comprising polyvinyl alcohol or a derivative thereof having adsorbed thereon iodine or a dichroic dye as a polarizing element with a nonrotatory polarizing cellulose film (e.g., a cellulose triacetate film) adhered to both sides of the stretched film. In addition, a polyene type polarizing sheet obtained by dehydrochlorination of a polyvinyl chloride film or dehydration of a polyvinyl alcohol film, or a polarizing sheet obtained by blending a hydrophobic resin (e.g., polyethylene terephthalate) with a dichroic dye followed by uniaxially stretching can also be used. From the standpoint of polarization characteristics and hue characteristics, preferred of them is a polarizing sheet comprising a polyvinyl alcohol film having adsorbed thereon iodine or a dichroic dye with a cellulose film (e.g., a cellulose triacetate film) adhered on both sides thereof as a protective film.

The above-described composite polarizing sheet can be obtained by adhering the optical film of the present invention and a polarizing sheet with a tackifier or an adhesive in such a manner that the optical axis of the polarizing sheet and that of the optical film of the invention are so combined as to exhibit the optimum image quality when assembled into a liquid crystal display, etc. Also included in the composite polarizing sheet are the one obtained by removing a protective film from one side of a linear polarizing sheet and adhering the optical film of the invention directly to the polarizer with an adhesive or a tackifier, etc. and the one obtained by adhering the optical film of the invention to a side of a linear polarizing sheet having no protective film, said polarizing sheet being composed of a hydrophobic high polymer film and a dichroic dye.

The thus obtained optical film or composite polarizing sheet suffers from no substantial optical unevenness and passes the accelerated durability test at 80° C. or 60° C. and 90% RH (relative humidity). Hence, it is applicable to novel uses, for example, liquid crystal displays, according to its orientation properties and optical characteristics, such as retardation.

Modes of applying the optical film of the present invention to liquid crystal displays and effects produced are described below.

(1) Where the birefringent optical film of the present invention is provided on the upper side of an upper polarizing sheet of a TN mode liquid crystal display in which liquid crystal molecules have a twisted angle of 90°, no rainbow pattern or the like is observed when seen through polarizing sunglasses from any direction, and markedly improved image quality can be obtained as compared with the case of using conventional elliptical polarizing sheets.

(2) Where the birefringent optical film of the present invention is provided on the lower side of an upper polarizing sheet of a TN mode liquid crystal display in which liquid crystal molecules have a twisted angle of 90°, an interference color of the liquid crystal layer can be eliminated uniformly over the entire surface of a large screen to thereby markedly improve image quality.

(3) An STN mode liquid crystal display in which liquid crystal molecules have a twisted angle of 180° to 270° undergoes coloring arising from birefringence of the liquid crystal layer. Image quality of the STN mode liquid crystal display can be improved by providing the birefringent optical film of the invention between the upper polarizing sheet or lower polarizing sheet and the liquid crystal cell of the STN mode liquid crystal display in such a manner that the optical axis of the optical film may form an angle of from 30° to 60° and preferably from 40° to 50° with respect to the optical axis of the polarizing sheet. A B/W display can be made where the pair of the polarizing sheets are provided in such a manner that their optical axes are crossing or nearly crossing or in parallel or nearly in parallel with each other.

(4) In an ECB mode liquid crystal display in which birefringence of a liquid crystal cell is controlled by application of an electric field (typically including a homeotropic (DAP) liquid crystal cell in which the longer axis of liquid crystal molecules is controlled in a vertical direction), coloring due to birefringence takes place. To compensate for the coloring, the birefringent optical film of the present invention can be used similarly to the above-described application to the STN mode liquid crystal display to thereby improve image quality.

The present invention is now illustrated by way of Examples, but it should be understood that the present invention is not construed as being limited thereto. In Examples, R values of optical films were determined by using a polarization microscope equipped with a Senarmont compensator (546 nm) and a halogen lamp as a light source. The linear polarizing sheet used in Examples was a uniaxially stretched polyvinyl alcohol film having adsorbed therein iodine as a dichroic coloring matter as prepared according to a known process as described, e.g., in JP-A-61-20008. If desired, the linear polarizing sheet had a transparent nonrotatory polarizing polymer film (e.g., a cellulose triacetate film) as a protective film.

In Examples, all the percents are by weight unless otherwise indicated.

EXAMPLE 1

A 22% dope solution was prepared from polycarbonate having an average molecular weight of about 60,000 and methylene chloride. A 180 μm thick transparent polycarbonate film (heat distortion temperature: 135° C.) was prepared from the dope solution by solvent casting. The film thickness in the machine direction was continuously measured, and the results are shown in FIG. 2. As shown in FIG. 2, there was observed no periodic thickness variation of sine waveform.

The resulting optical film had an R value of 40 nm with a ΔR value of 6.8% and a G value of 0.38%/cm, proving optically uniform.

EXAMPLE 2

The optical film prepared in Example 1 was subjected to a heat treatment at 190° C. for 10 minutes to obtain an optical film with substantially no orientation as having an R value of 10 nm or less.

EXAMPLE 3

A dumbbell specimen (JIS #3; 5 mm wide) was cut out of the optical film prepared in Example 1, and tensile test was carried out at a temperature around the heat distortion temperature. The stress-strain curve obtained is shown in FIG. 1. As a result, the temperature at which a yield point apparently disappeared from the stress-strain curve was found to be about 165° C.

The film was preheated at 190° C. to adjust the birefringence to $0.4 \times 10^{-4}$ and then subjected to transverse uniaxial stretching at 170° C. at a stretch ratio of 1.8 by means of a tentering machine (manufactured by Hirano Kinzoku K.K.; 2 m wide×9 m long), followed by heat treating at 140° C. to obtain a 100 μm thick stretched film. The resulting stretched film had an R value of 540 nm, a ΔR of 4.5% and a G of 0.54%/cm. No streaking appeared when the film was observed under crossed polarizers with its optical axis being at 45°, proving that the film was a uniform optical film free from optical unevenness.

The resulting optical film was adhered to a side of a polarizing sheet with an acrylic adhesive with its optical axis being at about 45° to obtain a composite polarizing sheet.

Further, when the optical film was inserted between a liquid crystal cell and an upper polarizing sheet of a liquid crystal display in which liquid crystal molecules had a twisted angle of 200°, the liquid crystal display exhibited satisfactory image quality, making a B/W display having a black image on a white background without color unevenness such as a rainbow pattern.

EXAMPLE 4

The optical film of Example 1 was preheated to 195° C. to adjust the birefringence to $0.24 \times 10^{-4}$ and then subjected to transverse uniaxial stretching at 175° C. at a stretch ratio of 1.5 by means of a tentering machine, followed by heat treating at 140° C. to obtain a 120 μm thick stretched film.

The resulting stretched film had an R value of 280 nm, a ΔR of 3.5%, and a G of 0.46%/cm. When the film was seen through crossed polarizers with the optical axis thereof being at 45°, no streak was observed, proving uniform with reduced optical unevenness.

The optical film was adhered to a side of a polarizing sheet with an acrylic adhesive with its optical axis being at 45° to obtain a composite polarizing sheet.

Further, the optical-film was adhered between a liquid crystal cell and an upper polarizing sheet of a liquid crystal display in which liquid crystal molecules had a twisted angle of 200° with an adhesive, the liquid crystal display exhibited satisfactory image quality, making a B/W display having a black image on a white background without color unevenness such as a rainbow pattern.

EXAMPLE 5

The optical film of Example 1 was preheated to 198° C. to adjust the birefringence to $0.35 \times 10^{-4}$ and then subjected to transverse uniaxial stretching at 168° C. at a stretch ratio of 2.2 by means of a tentering machine, followed by heat treating at 140° C. to obtain a 82 μm thick stretched film.

The resulting stretched film had an R value of 830 nm, a ΔR of 6.6%, and a G of 0.63%/cm. When the film was seen through crossed polarizers with the optical axis thereof being at 45°, no streak was observed, proving uniform with reduced optical unevenness.

When the optical film was adhered between a liquid crystal cell and an upper polarizing sheet of a liquid crystal display in which liquid crystal molecules had a twisted angle of 200° with an adhesive, there was obtained a liquid crystal display which exhibited satisfactory image quality, making a B/W display having a black image on a white background without color unevenness such as a rainbow pattern.

COMPARATIVE EXAMPLE 1

A 180 μm thick film was prepared from polycarbonate having an average molecular weight of about 30,000 by melt extrusion. The film thickness was measured continuously in the extrusion direction, and the results obtained are shown in FIG. 3. As shown in FIG. 3, there were observed periodic thickness variation of a sine waveform having a pitch of 23 mm and a thickness change (fluctuation) of 1.5 μm. Further, the film showed streaks called gear marks.

The film had a heat distortion temperature of 135° C., an R value of 30 nm, a ΔR of 21%, and a G of 1.52%/cm, proving optically non-uniform.

COMPARATIVE EXAMPLE 2

The film prepared in Comparative Example 1 was subjected to a heat treatment at 190° C. for 10 minutes to obtain an optical film. The resulting film had an average $\bar{R}$ value of less than 10 nm with substantially no orientation but showed gear marks.

COMPARATIVE EXAMPLE 3

The procedure of Example 3 was repeated, except for using the optical film prepared in Comparative Example 1, to obtain a 100 μm thick stretched film. The stretched film had an R value of 535 nm, a ΔR of 11.4%, and a G of 1.45%/cm. When placed under crossed polarizers with its optical axis being at 45°, the film showed streaks, proving inferior in optical uniformity to the stretched film of Example 3.

Further, application of the optical film to a liquid crystal display in the same manner as in Example 3 achieved a B/W display having a black image on a white background, but streaks were clearly observed.

COMPARATIVE EXAMPLE 4

The optical film of Comparative Example 1 was stretched in the same manner as in Example 4 to obtain a 120 μm thick stretched film. The stretched film had an R value of 280 nm, a ΔR of 10%, and a G of 1.40%/cm, but streaks were observed when seen through crossed polarizers with the optical axis of the film being at 45°, proving that the film was inferior in optical uniformity to the stretched film of Example 4.

Further, application of the optical film to a liquid crystal display in the same manner as in Example 4 made it feasible to make a B/W display having a black image on a white background, but streaks clearly appeared.

EXAMPLE 6

Figure 4:
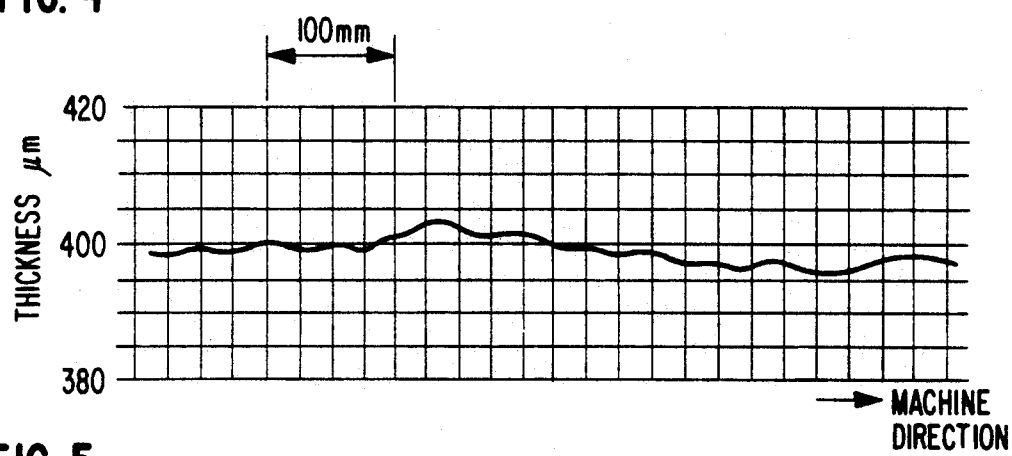

A 400 μm thick film was prepared from a polyester copolymer ("PET G 6768" produced by Eastman Chemical) by melt extrusion. The heat distortion temperature of the film was 81° C. The film had no periodic thickness variation of sine waveform in the extrusion direction as shown in FIG. 4. The film had an R value of 70 nm, a ΔR of 9.2%, and a G of 0.47%/cm and exhibited optical uniformity.

EXAMPLE 7

A stress-strain curve of the film of Example 6 was prepared in the same manner as in Example 3 to find that the temperature at which a yield point apparently disappeared was about 105° C.

The film of Example 6 was preheated at 135° C. and then subjected to transverse uniaxial stretching at 122° C. by tentering to obtain a stretched film having a thickness of about 240 μm. The stretched film had an R value of 485 nm, a ΔR of 5.8%, and a G of 0.72%/cm. When placed under crossed polarizers with its optical axis being at 45°, the film showed no streaks, proving uniform with reduced optical uneveneness.

The optical film was adhered to a side of a polarizing sheet with an acrylic adhesive with its optical axis being at about 45° to obtain a composite polarizing sheet. Further, when the optical film was applied to a liquid crystal display in the same manner as in Example 1, the liquid crystal display could substantially made a B/W display with satisfactory image quality.

COMPARATIVE EXAMPLE 5

Figure 5:
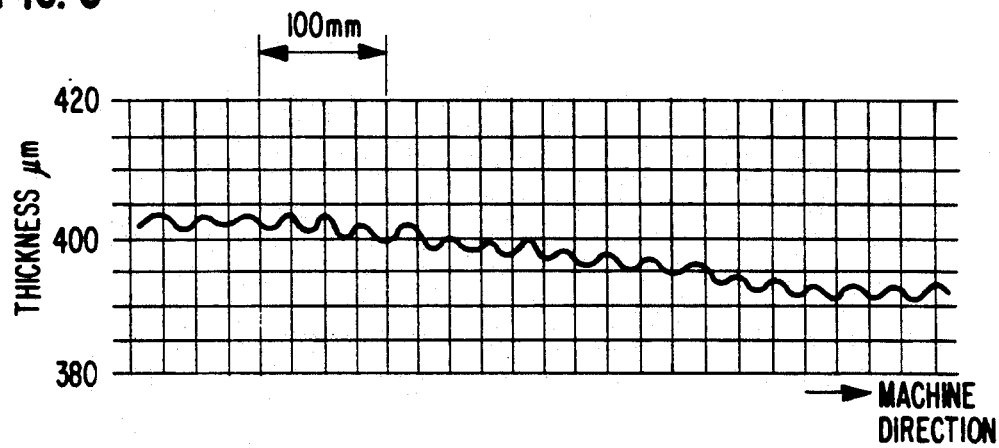

A 400 μm thick film (heat distortion temperature: 81° C.) was prepared by melt extrusion of a polyester copolymer "PET G6768". On continuous examination of the film thickness in the extrusion direction, the film had periodic thickness variation of sine waveform having a pitch of 30 mm and a thickness variation of 2.5 μm as shown in FIG. 5 and showed streaks called gear marks. The film had an R value of 65 nm, a ΔR of 20.4%, and a G of 1.34%/cm.

COMPARATIVE EXAMPLE 6

A stretched film was obtained in the same manner as in Example 7, except for using the film of Comparative Example 5. The stretched film had an R value of 525 nm, a ΔR of 10.8%, and a G of 1.56%/cm. When placed under crossed polarizers with its optical axis being at 45°, the film showed streaks, etc., proving inferior in optical uniformity to the optical film of Example 7.

When the resulting film was applied to a liquid crystal display in the same manner as in Example 3, the display could make a substantial B/W display but showed clear streaks, thus failing to exhibit satisfactory image quality.

EXAMPLE 8

Figure 6:
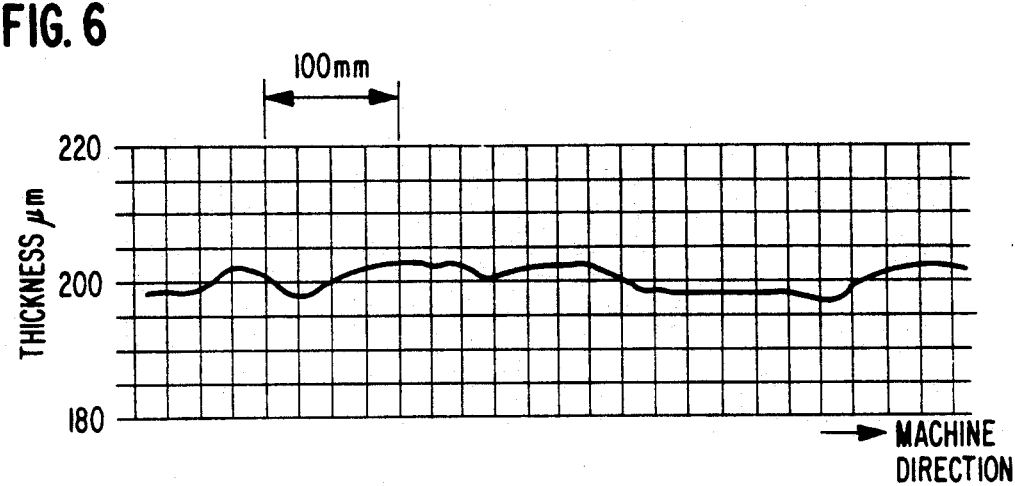

A 200 μm thick film was prepared by melt extrusion of polysulfone (heat distortion temperature: 174° C.). On continuous examination of film thickness in the extrusion direction, the film had no periodic thickness variation of sine waveform as shown in FIG. 6. The film had an R value of 55 nm, a ΔR of 7.6%, and a G of 0.93%/cm.

EXAMPLE 9

A stress-strain curve of the film of Example 8 was obtained in the same manner as in Example 3 to find that the temperature at which a yield point apparently disappeared was about 200° C.

The film was preheated at 230° C. and then subjected to transverse uniaxial stretching at 210° C. by tentering to obtain an about 105 μm thick stretched film. The stretched film had an R value of 780 nm, a ΔR of 7.5%, and a G of 0.80%/cm. When placed under crossed polarizers with an optical axis being at 45°, the film had no streaks, proving uniform with reduced optical unevenness.

The optical film was adhered to a side of a polarizing sheet with an acrylic adhesive with its optical axis being at about 45° to obtain a composite polarizing sheet. Further, the optical film was applied to a liquid crystal display in the same manner as in Example 5 to obtain a liquid crystal display capable of making a substantial B/W display with satisfactory image quality.

COMPARATIVE EXAMPLE 7

Figure 7:
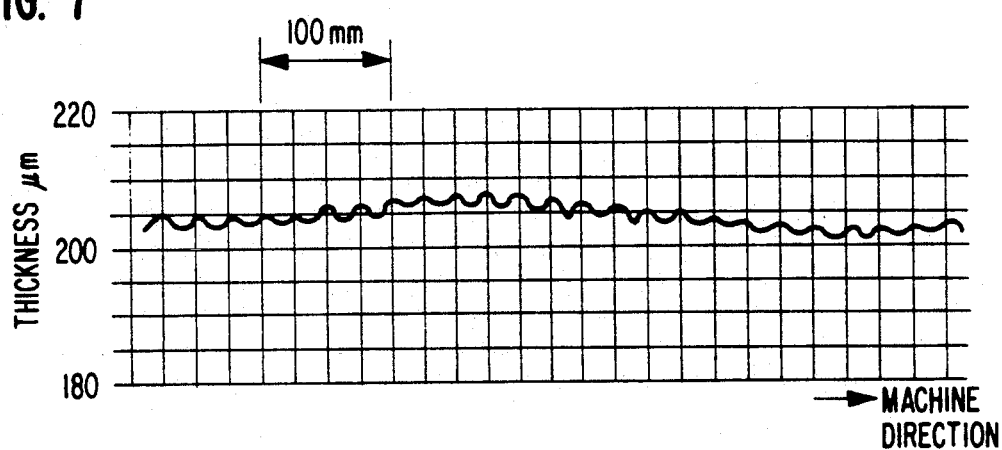

A 200 μm thick film (heat distortion temperature: 174° C.) was prepared by melt extrusion of polysulfone. On continuous examination of film thickness in the extrusion direction, the film had periodic thickness variation of sine waveform having a pitch of 25 mm and a fluctuation of 2 μm as shown in FIG. 7, showing streaks called gear marks. The film had an R value of 60 nm, a ΔR of 19.0%, and a G of 1.50%/cm.

COMPARATIVE EXAMPLE 8

A stretched film was obtained in the same manner as in Example 9, except for using the film of Comparative Example 7. The stretched film had an R value of 790 nm, a ΔR of 10.0%, and a G of 1.61%/cm. When placed under crossed polarizers with its optical axis being at 45°, the film showed streaks, proving inferior in optical uniformity to the film of Example 9.

When the film was applied to a liquid crystal display in the same manner as in Example 5, the display could make a substantial B/W display but showed clear streaks, failing to exhibit satisfactory image quality.

EXAMPLE 10

The optical film prepared in Example 1 was subjected to simultanesous biaxial stretching at 175° C. at a stretch ratio of 1.5. The resulting stretched film was found to have no substantial in-plane orientation and be anisotropic in refractive index. When the film was placed under crossed polarizers and observed, it showed no streaks, proving free from optical unevenness.

COMPARATIVE EXAMPLE 9

The film of Comparative Example 1 was subjected to biaxial stretching in the same manner as in Example 10. Although the resulting stretched film was found to have substantially no in-plane orientation and be anisotropic in refractive index in the thickness direction, clear streaks were observed when the film was placed under crossed polarizers, indicating considerable optical unevenness.

EXAMPLE 11

Figure 8:
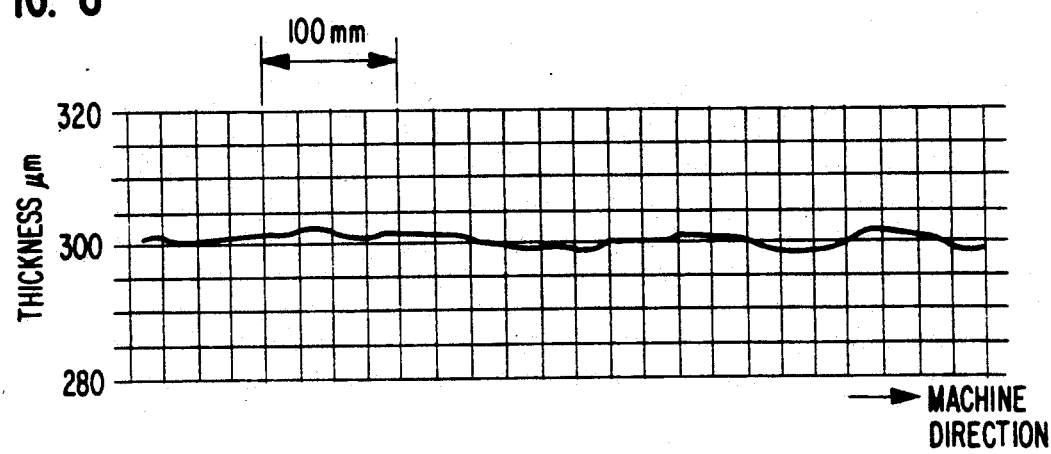

A 20% dope solution was prepared from polystyrene and an acetone/cyclohexane mixed solvent. A transparent polystyrene film having a thickness of 300 μm was prepared from the dope solution by solvent casting. The film had a heat distortion temperature of 98° C. On continuous examination of film thickness in the machine direction, the film showed no periodic thickness variation of sine waveform as shown in FIG. 8. The resulting film had an R value of 35 nm, a ΔR of 8.3%, and a G of 0.47%/cm and was proved optically uniform.

EXAMPLE 12

The optical film prepared in Example 11 was preheated at 140° C. and then subjected to transverse uniaxial stretching at 110° C. by tentering to obtain a stretched film having a thickness of about 150 μm. The stretched film had an R value of 515 nm, a ΔR of 6.8%, and a G of 0.63%/cm. When placed under crossed polarizers and observed, no streak appeared, proving optically uniform free from optical unevenness.

The stretched film was adhered to a side of a polarizing sheet with an acrylic adhesive with its optical axis being at 45° to obtain a composite polarizing sheet.

Further, the optical film was applied to a liquid crystal display in the same manner as in Example 3, there was obtained a liquid crystal display capable of making a substantial B/W display with satisfactory image quality.

EXAMPLE 13

The film prepared in Example 11 was subjected to biaxial stretching at 110° C. at a stretched ratio of 2. The resulting stretched film had no substantial in-plane orientation and was anisotropic in refractive index in the thickness direction. When observed under crossed polarizers, the film showed no streaks, proving free from optical unevenness.

EXAMPLE 14

Figure 9:
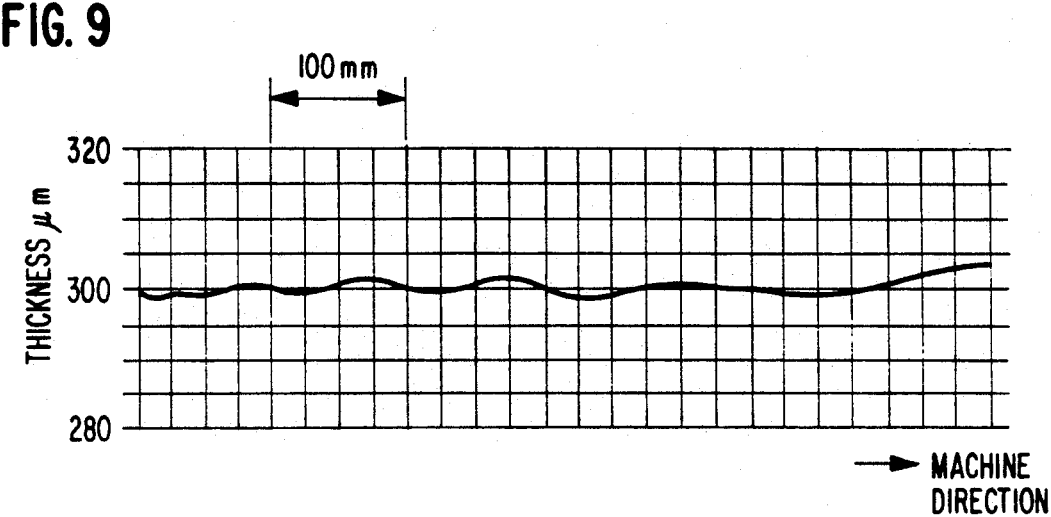

A 18% dope solution was prepared from a styrene-acrylonitrile copolymer (73/27 by weight) and an acetone/methyl ethyl ketone mixed solvent. A 300 μm thick transparent styrene-acrylonitrile copolymer film (heat distortion temperature: 102° C.) was obtained from the dope solution by solvent casting. On continuous examination of film thickness in the machine direction, the film had no periodic thickness variation of sine waveform as shown in FIG. 9. The film had an R value of 40 nm, a ΔR of 6.6%, and a G of 0.51%/cm and was optically uniform.

EXAMPLE 15

The film prepared in Example 14 was preheated at 160° C. and then subjected to transverse uniaxial stretching at 120° C. by tentering to obtain a stretched film having a thickness of about 145 μm. The stretched film had an R value of 560 nm, a ΔR of 5.9%, and a G of 0.55%/cm. When placed under crossed polarizers with its optical axis being at 45° and observed, the film showed no streaks, proving optically uniform with no optical unevenness.

The stretched film was adhered to a side of a polarizing sheet with an acrylic adhesive with its optical axis being at 45° to obtain a composite polarizing sheet.

Further, when the stretched film was applied to a liquid crystal display in the same manner as in Example 3, there was obtained a liquid crystal display capable of making a substantial B/W display with satisfactory image quality.

EXAMPLE 16

The film prepared in Example 14 was subjected to simultaneous biaxial stretching at 120° C. at a stretch ratio of 1.7. The resulting biaxially stretched film had no substantial in-plane orientation and showed anisotropy of refractive index in the thickness direction. When the film was placed under crossed polarizers, no streak was observed, proving the film to be free from optical unevenness.

COMPARATIVE EXAMPLE 10

Figure 10:
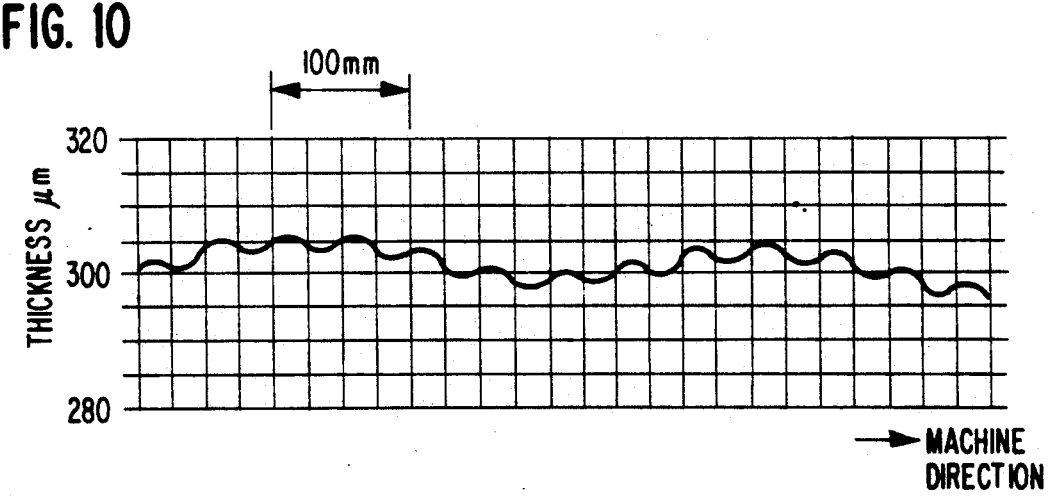

A 300 μm thick styrene-acrylonitrile copolymer film was prepared from the same resin as used in Example 14 by melt extrusion. On continuous examination of film thickness in the machine direction, the film showed periodic thickness variation of sine waveform having a pitch of 25 mm and a thickness change of 1.5 μm as shown in FIG. 10, called gear marks. The film had an R value of 55 nm, a ΔR of 14.3%, and a G of 1.18%/cm.

COMPARATIVE EXAMPLE 11

A stretched film was obtained in the same manner as in Example 15, except for using the film of Comparative Example 9. The resulting stretched film had an R value of 550 nm, a ΔR of 11.8%, and a G of 1.46%. When placed under crossed polarizers with its optical axis being at 45°, the film showed streaks, proving inferior in optical uniformity to the film of Example 15.

Further, when the film was applied to a liquid crystal display in the same manner as in Example 15, the display could make a substantial B/W display but showed clear streaks, failing to exhibit satisfactory image quality.

While the invention has been described in detail and with reference to specific embodiments thereof, it will be apparent to one skilled in the art that various changes and modifications can be made therein without departing from the spirit and scope thereof.

What is claimed is:

1. A thermoplastic resin film having no periodic thickness variation having a pitch of 50 mm or less and a thickness change of 0.5 μm or more on continuous thickness measurement in the machine direction thereof, wherein said resin is selected from the group consisting of polycarbonate resins, methacrylate resins, styrene resins, α-methylstyrene polymer resins, acrylonitrile resins, polyester resins, polyamide resins, vinyl chloride resins, polyolefin resins, polysulfone, polyether sulfone, fluorine-containing resins, and modified resins thereof.

2. A thermoplastic resin film as claimed in claim 1, wherein said thermoplastic resin film has no periodic thickness variation having a thickness change of 0.3 μm or more.

3. A thermoplastic resin film as claimed in claim 1, wherein said film is continuously prepared by solvent casting.

4. An optical film having a retardation value of 1200 nm or less with a fluctuation of not more than 10%, which is obtained by uniaxially or biaxially stretching a thermoplastic resin film having no periodic thickness variation having a pitch of 50 mm or less and a thickness change of 0.5 μm or more on continuous thickness measurement in the machine direction thereof.

5. An optical film as claimed in claim 4, wherein said optical film has no periodic thickness variation having a thickness change of 0.3 μm or more.

6. An optical film as claimed in claim 4, wherein said thermoplastic resin film is continuously prepared by solvent casting.

7. An optical film having a retardation value of 1200 nm or less with a fluctuation of not more than 10% and a rate of change of not more than 1.3%/cm, which is obtained by uniaxially stretching a thermoplastic resin film.

8. An optical film as claimed in claim 7, wherein said thermoplastic resin film is continuously prepared by solvent casting.

9. An optical film having a retardation value of 1200 nm or less with a fluctuation of not more than 10% and a rate of change of not more than 1.3%/cm, which is obtained by uniaxially stretching a thermoplastic resin film having no periodic thickness variation having a pitch of 50 mm or less and a thickness change of 0.5 μm or more on continuous thickness measurement in the machine direction thereof.

10. An optical film as claimed in claim 9, wherein said thermoplastic resin film is continuously prepared by solvent casting.

11. A phase retarder comprising a thermoplastic resin film having no periodic thickness variation having a pitch of 50 mm or less and a thickness change of 0.5 μm or more on continuous thickness measurement in the machine direction thereof.

12. A phase retarder comprising an optical film having a retardation value of 1200 nm or less with a fluctuation of not more than 10%, which is obtained by uniaxially or biaxially stretching a thermoplastic resin film having no periodic thickness variation having a pitch of 50 mm or less and a thickness change of 0.5 μm or more on continuous thickness measurement in the machine direction thereof.

13. A phase retarder comprising an optical film having a retardation value of 1200 nm or less with a fluctuation of not more than 10% and a rate of change of not more than 1.3%/cm, which is obtained by uniaxially stretching a thermoplastic resin film.

14. A phase retarder comprising an optical film having a retardation value of 1200 nm or less with a fluctuation of not more than 10% and a rate of change of not more than 1.3%/cm, which is obtained by uniaxially stretching a thermoplastic resin film having no periodic thickness variation having a pitch of 50 mm or less and a thickness change of 0.5 μm or more on continuous thickness measurement in the machine direction thereof.

15. A composite polarizing sheet comprising a polarizing sheet having laminated thereon a thermoplastic resin film having no periodic thickness variation having a pitch of 50 mm or less and a thickness change of 0.5 μm or more on continuous thickness measurement in the machine direction thereof.

16. A composite polarizing sheet comprising a polarizing sheet having laminated thereon an optical film having a retardation value of 1200 nm or less with a fluctuation of not more than 10%, which is obtained by uniaxially or biaxially stretching a thermoplastic resin film having no periodic thickness variation having a pitch of 50 mm or less and a thickness change of 0.5 μm or more on continuous thickness measurement in the machine direction thereof.

17. A composite polarizing sheet comprising a polarizing sheet having laminated thereon an optical film having a retardation value of 1200 nm or less with a fluctuation of not more than 10% and a rate of change of not more than 1.3%/cm, which is obtained by uniaxially stretching a thermoplastic resin film.

18. A composite polarizing sheet comprising a polarizing sheet having laminated thereon an optical film having a retardation value of 1200 nm or less with a fluctuation of not more than 10% and a rate of change of not more than 1.3%/cm, which is obtained by uniaxially stretching a thermoplastic resin film having no periodic thickness variation having a pitch of 50 mm or less and a thickness change of 0.5 μm or more on continuous thickness measurement in the machine direction thereof.

19. An optical film having a retardation value of 1,200 nm or less with a retardation fluctuation of not more than 10% and a rate of change of said retardation value of not more than 1.3%/cm, and wherein said optical film comprises a thermoplastic resin selected from the group consisting of styrene resins, polyester resins, polysulfone, polyether sulfone, and modified resins thereof.

20. An optical film as claimed in claim 19, wherein said thermoplastic resin film has been continuously prepared by solvent casting.

21. An optical film as claimed in claim 20, wherein said thermoplastic resin is a styrene-acrylonitrile copolymer.

22. An optical film as claimed in claim 20, wherein said thermoplastic resin is a polyester copolymer.

23. An optical film as claimed in claim 19, wherein said thermoplastic resin is a styrene-acrylonitrile copolymer.

24. An optical film as claimed in claim 19, wherein said thermoplastic resin is a polyester copolymer.

25. A phase retarder comprising an optical film as in claim 19.

26. A composite polarizing sheet comprising a polarizing sheet having laminated thereon an optical film as in claim 19.

* * * * *